(12) United States Patent
Caccin et al.

(10) Patent No.: US 11,295,521 B2
(45) Date of Patent: Apr. 5, 2022

(54) GROUND MAP GENERATION

(71) Applicant: Woven Planet North America, Inc., Los Altos, CA (US)

(72) Inventors: Marco Caccin, Munich (DE); Clemens Marschner, Munich (DE); Nikolai Morin, Munich (DE); Darko Zikic, Munich (DE)

(73) Assignee: Woven Planet North America, Inc., Los Altos, CA (US)

( * ) Notice: Subject to any disclaimer, the term of this patent is extended or adjusted under 35 U.S.C. 154(b) by 72 days.

(21) Appl. No.: 16/830,100

(22) Filed: Mar. 25, 2020

(65) Prior Publication Data

US 2021/0304491 A1 Sep. 30, 2021

(51) Int. Cl.
*G06T 17/05* (2011.01)
*G01C 21/32* (2006.01)
*G06T 5/00* (2006.01)

(52) U.S. Cl.
CPC .............. *G06T 17/05* (2013.01); *G01C 21/32* (2013.01); *G06T 5/002* (2013.01); *G06T 2207/10028* (2013.01)

(58) Field of Classification Search
None
See application file for complete search history.

(56) References Cited

U.S. PATENT DOCUMENTS

| 7,660,441 | B2 | 2/2010 | Chen et al. |
| 10,816,993 | B1* | 10/2020 | Tran ................... G05D 1/0246 |
| 2014/0253679 | A1 | 9/2014 | Guigues et al. |
| 2017/0316333 | A1 | 11/2017 | Levinson et al. |
| 2020/0410641 | A1* | 12/2020 | Hayami ................. G06T 7/187 |

FOREIGN PATENT DOCUMENTS

| KR | 20170085752 A | 7/2017 |
| WO | 2018209103 A2 | 11/2018 |

OTHER PUBLICATIONS

International Searching Authority, International Search Report and Written Opinion, PCT/US2021/023956, dated Jul. 15, 2021.

* cited by examiner

*Primary Examiner* — Yanna Wu
(74) *Attorney, Agent, or Firm* — Christopher G. Darrow; Darrow Mustafa PC

(57) ABSTRACT

The present disclosure relates to a method of generating a ground map. For instance, the present disclosure provides a method of determining relevant point cloud data for generating a surface topology over real-world geographical areas using sensor data, which may involve (i) receiving a first dataset from a first sensor, (ii) receiving a second dataset from a second sensor, (iii) classifying the first dataset by identifying characteristics of the first dataset that correspond to a ground surface, (iv) filtering the second dataset based on the classified first dataset, and (v) generating a ground map from the filtered second dataset.

20 Claims, 13 Drawing Sheets

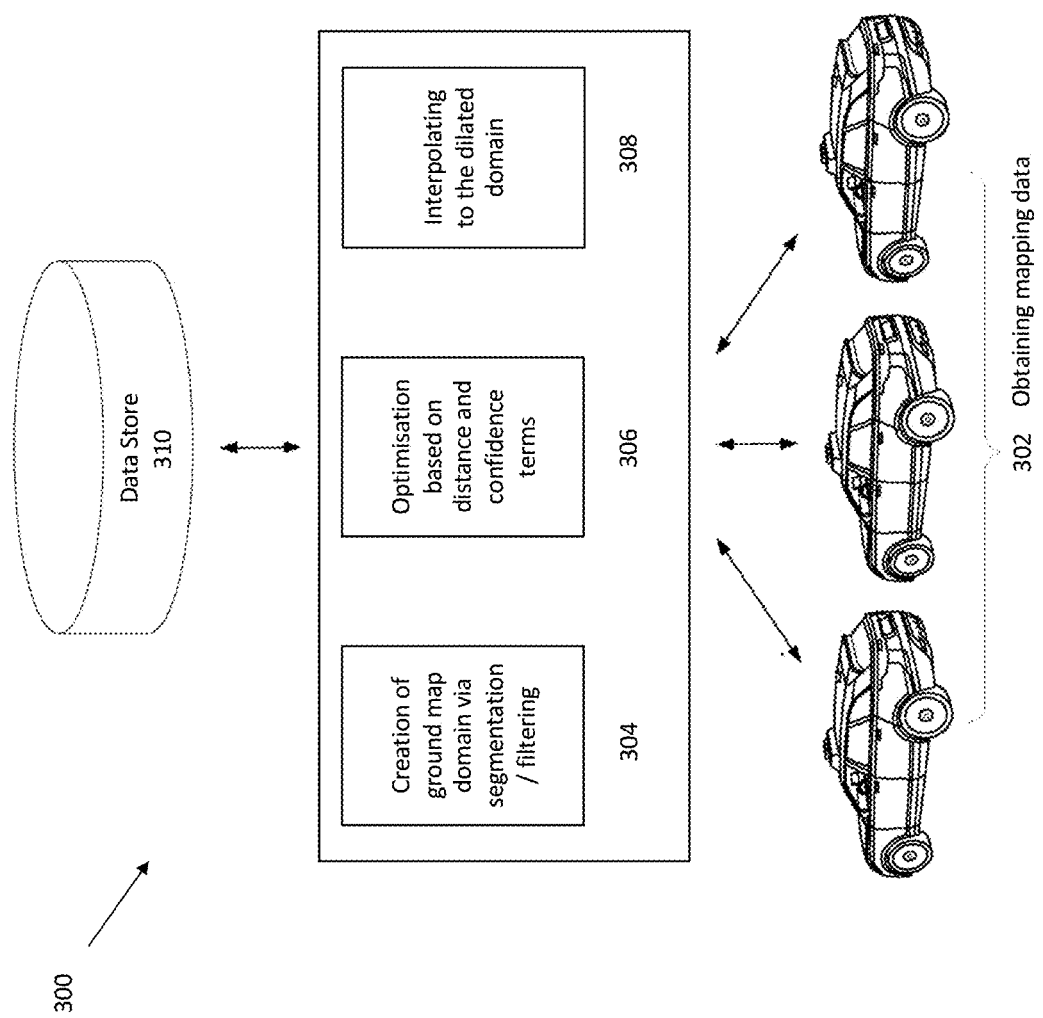

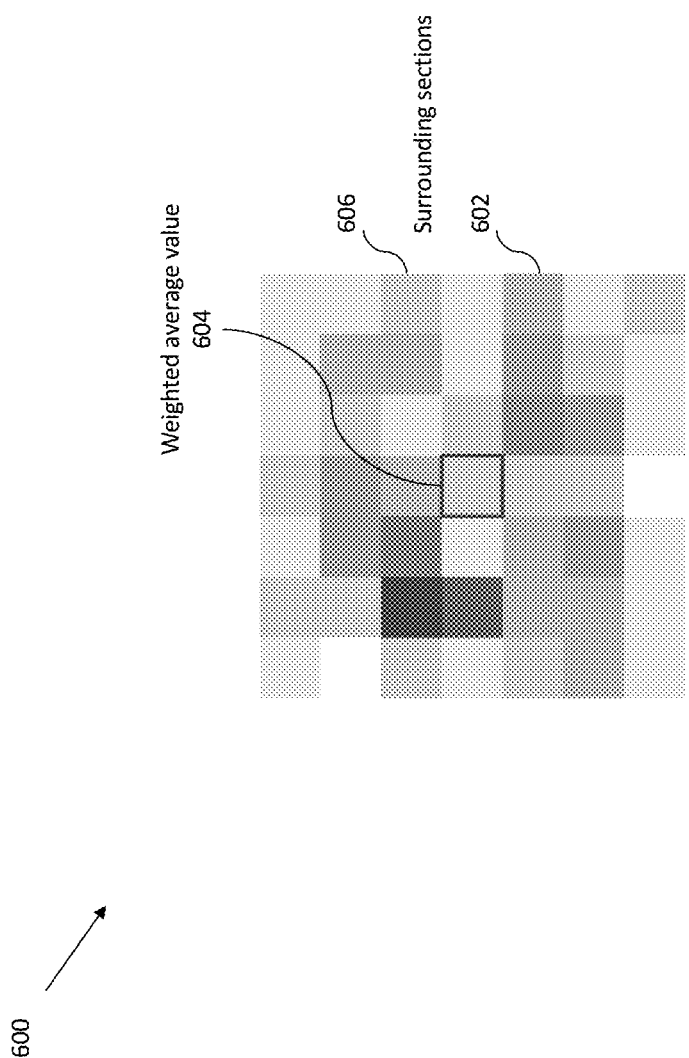

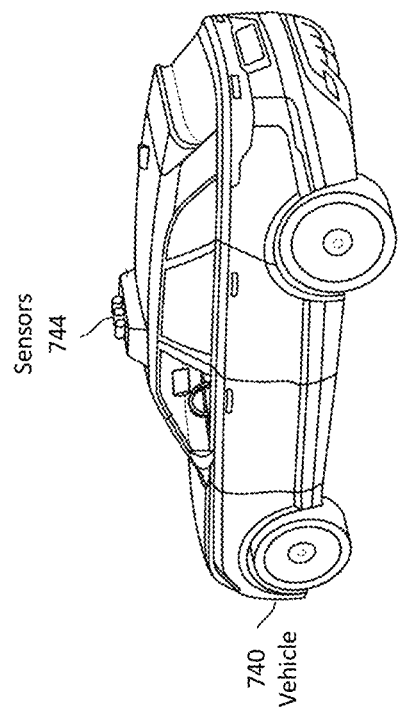
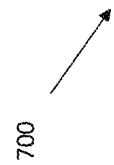
FIG. 7

GROUND MAP GENERATION

FIELD OF THE INVENTION

The present disclosure relates to a method of generating a ground map. More particularly, the present disclosure relates to a method of determining relevant point cloud data for generating a surface topology over real-world geographical areas using sensor data to use in a ground map.

BACKGROUND

Methods of ground map generation are limited by existing image processing techniques and methods of filtering data. These limitations often lead to inaccurate generation of ground maps, and having to use techniques that are not scalable. Current methods require high computational power and large amounts of time to generate baseline models suitable for generating ground maps. This directly impacts any subsequent step involved in ground map generation or use, and contributes to inadequate runtime performance and scalability, and to excessive memory consumption, all of which are suboptimal in existing methods. These factors also limit the ability to generate ground maps in substantially real-time, thus resulting in ground maps which do not reflect changes in the real-world due to the delay in producing or updating the ground map. Furthermore, existing methods do not make use of a priori knowledge of the real-world, for example curvature and inclines or declines of a ground surface are often omitted from ground maps.

Typically, when generating ground map data, surveying sensors are often deployed to build three-dimensional point clouds of geographical areas. However, existing methods are often subject to irregular point cloud filtering which can be caused by erroneous classification and/or reflection/refraction errors whilst building the initial point cloud. These problems compound the difficulties in generating accurate and usable ground maps.

SUMMARY

Various embodiments of the present technology can include methods that involve (i) receiving a first dataset from a first sensor, (ii) receiving a second dataset from a second sensor, (iii) classifying the first dataset by identifying characteristics of the first dataset that correspond to a ground surface, (iv) filtering the second dataset based on the classified first dataset, and (iv) generating a ground map from the filtered second dataset.

Further, various embodiments of the present technology can include non-transitory computer-readable mediums comprising program instructions that are executable by at least one processor to cause a computing system to (i) receive a first dataset from a first sensor, (ii) receive a second dataset from a second sensor, (iii) classify the first dataset by identifying characteristics of the first dataset that correspond to a ground surface, (iv) filter the second dataset based on the classified first dataset, and (v) generate a ground map from the filtered second dataset.

Further yet, various embodiments of the present technology can include a computer system comprising at least one processor, at least one non-transitory computer-readable medium, program instructions stored on the at least one non-transitory computer-readable medium that are executable by the at least one processor such that the computing system is operable to (i) receive a first dataset from a first sensor, (ii) receive a second dataset from a second sensor, (iii) classify the first dataset by identifying characteristics of the first dataset that correspond to a ground surface, (iv) filter the second dataset based on the classified first dataset, and Iv) generate a ground map from the filtered second dataset.

Various embodiments of the present technology can include methods, a non-transitory computer-readable medium and a system configured to receive a first dataset from a first sensor; receive a second dataset from a second sensor, classify the first dataset, wherein the classifying the first dataset comprises identifying characteristics of the first dataset that correspond to a ground surface, filter the second dataset based on the classified first dataset, and generate a ground map from the filtered second dataset.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF DRAWINGS

Embodiments will now be described, by way of example only and with reference to the accompanying drawings having like-reference numerals, in which:

FIG. 3 illustrates an example system implementing the method of ground map generation according to an embodiment;

FIG. 6 shows an example pixel tile comprising of 7×7 pixels, particularly representing a center pixel and its neighboring pixels;

FIG. 7 illustrates another example sensor platform, according to an embodiment.

Figure 1:
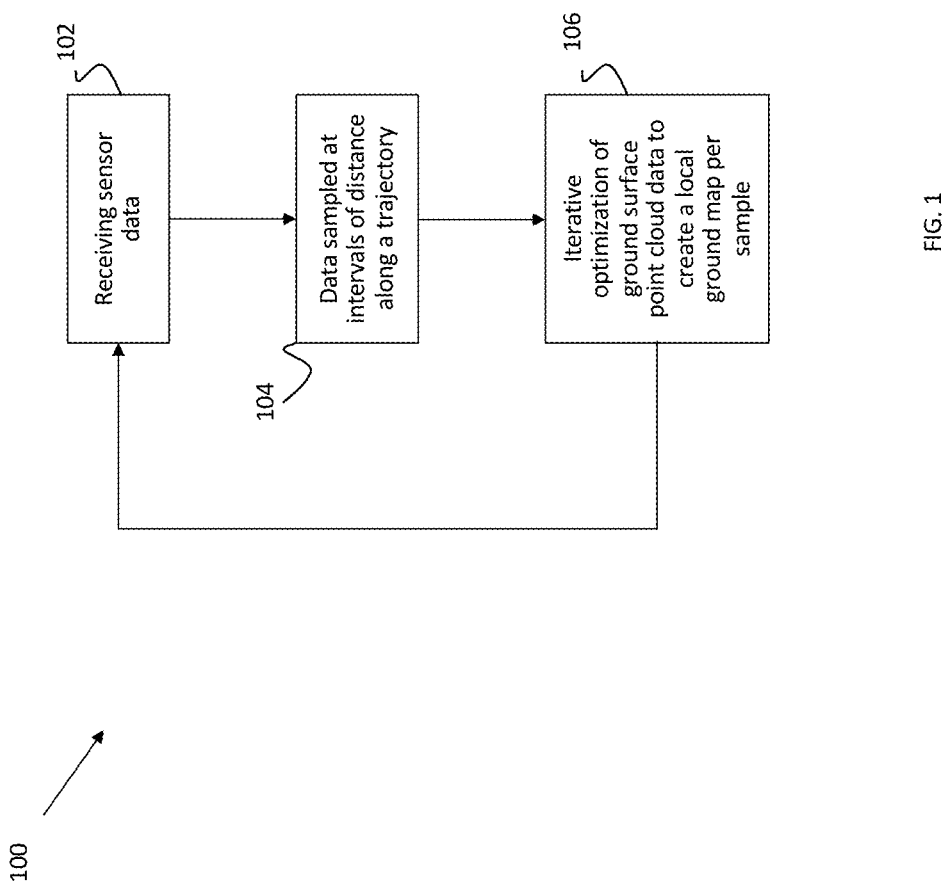
FIG. 1 shows a flowchart depicting a conventional method of ground map generation.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Referring to FIG. 1, one example of an existing ground map generation method is shown and will now be described.

Referring to FIG. 1, at block 102, sensor data is received from a LiDAR Light Detection and Ranging) sensor (or similar point cloud or object sensing device) where the sensor is mounted on a sensor platform (such as a ground transportation vehicle) moving around an environment to be mapped. At block 104, the trajectory of the sensing platform as it moves around the environment is used to sample the sensor data captured over the sensor platform trajectory, whereby the sensor data is sampled in equal intervals of distance traveled by the sensor platform. If a sensor platform's trajectory overlaps with itself, i.e. the same portion of the environment is encountered more than once in one trajectory, it is sampled again in a separate interval of the trajectory leading to multiple samples of the portions of the environment to be mapped. At block 106, for each sample, a point cloud data set is used to create a "local" ground map, which is placed and optimized for each sample (i.e. for each interval of distance along a sensory platform trajectory).

Existing ground map generation methods suffer from imprecision due to irregularities in the point clouds received as sensor data. In some instances, the sensors obtaining this data, such as a LiDAR sensor, can output sensor data including reflection and/or refraction errors which then causes inaccurate SLAM (Simultaneous Localization and Mapping) when using this sensor data. Additionally, sensors may not be able to capture the geographical area to be mapped in its entirety due to occlusions between sensor and portions of the environment, resulting in gaps or holes in the output sensor data. For example, point cloud data will not be captured for ground areas covered by parked vehicles or ground areas that suffer from constant heavy traffic where the view from the sensor to the area, and particularly to the ground surface, is intermittently obstructed. Imprecise and incomplete point cloud data means that ground map generation methods lack the ability to properly process or optimize point cloud data for use in ground map generation.

Existing ground map generation are inefficient due to the iterative optimization of each point (e.g., block 106 of FIG. 1), which is computationally costly and is designed for use with non-filtered point cloud data. In the situation where the input data is captured by vehicles traversing the same geographical areas multiple times, the iterative processing causes repetitive and mostly unnecessary computation of portions of the ground map, so typically results in outputting substantially the same result as would be obtained with just one pass of the geographical areas. The majority of computational time in existing methods is thus spent on the iterative process in which the entire point cloud is repeatedly re-computed to generate the ground map. Iterative computation of repeatedly updating point cloud data is extremely inefficient and in most cases provides incremental minimal value to the output ground map as further point cloud data is obtained by sensors and received for ground map computation.

Example embodiments relating to ground map generation and optimization will now be described with reference to FIGS. 2 to 8.

Figure 2:
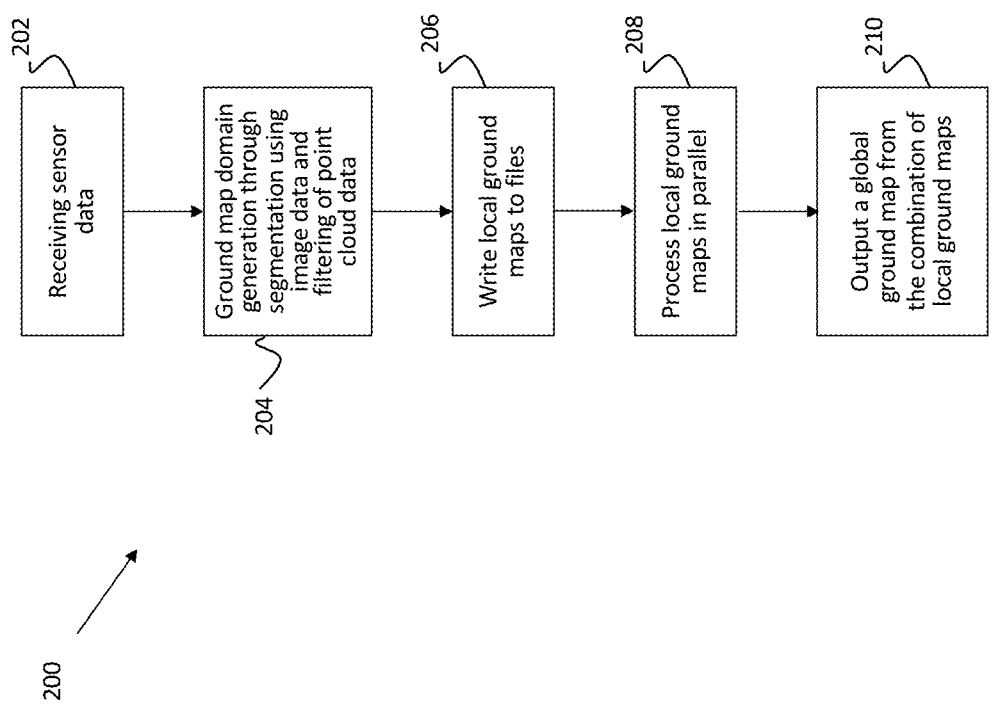
FIG. 2 shows an example high-level overview of the ground map generation process according to an embodiment.

FIG. 2 shows an outline of a process for generating a ground map according to an embodiment. At block 202, sensor data is received from at least two sensors which provides at least two sets of input data. The sensor data includes data relating to the ground surface, and generally comprises a sequence of data captured along a trajectory, received from two or more sensors. In some instance, the multiple data sets are synchronized as a result of the multiple sensors being co-calibrated. Multiple sensors or types of sensors can be used in this arrangement in order to classify a first dataset to filter a second dataset in order to generate accurate ground maps that focus on the ground surface alone. In an example embodiment, the received sensor data may take the form of image data captured by an image sensor (e.g., one or more cameras) and point cloud data captured by a LiDAR sensor (or another sensor capable of capturing point cloud data) on a sensor platform, where the image sensor captures images and the LiDAR sensor captures LiDAR data in sequence as the sensor platform transverses an environment to be mapped along a trajectory. The image sensor and LiDAR sensor may be pre-calibrated as described above.

At block 204, the ground map domain is then generated using the received sensor data. For instance, the generation may be performed by segmenting point cloud data received at block 202 using received image data received at block 202, to isolate the point cloud data associated with the ground of the environment to be mapped. Specifically, the image data is used to segment portions of each image (e.g. into classifications for each region of each image corresponding to for example buildings, trees, roads, cars) and then isolate the point cloud data correlating to the direction of the relevant regions of the field of view of the camera, so only point cloud data obtained in the directions classified in the synchronized image data as being related to the ground (e.g. classified as a road) is used to generate the ground map. Having at least two types of sensor data enables a multi-phase classification to generate more accurate ground maps. For example, referring to the example embodiment mentioned above, a first dataset which is captured using one or more image sensors can be used to provide a first classification of a ground area of a geographical area, and a second dataset captured using one or more LiDAR sensors can be used to provide a second stage of classification to further refine and focus on details of the ground surface.

After the ground map domain is generated, at block 206, the output ground map data for one or more local ground areas (i.e. each section of sampled trajectory)—which may each be referred to as a "local ground map"—may optionally be written to files (but in other embodiments the data can be kept in memory).

At block 208, the one or more local ground maps are then each processed in parallel to align and combine them into a larger or "global" ground map for an environment (or portion thereof) to be mapped, and at block 210, the combined "global" ground map for the environment (or portion thereof) is output. Typically, ground maps may or may not align especially when combining several smaller or local ground maps to create or update a larger or global map. Using the example embodiment described above, the trajectories associated with the sensor data can be used to find matching or complementary ground map portions which can help align two or more map portions. Additionally, having ground maps generated from filtered sensor data enables ground maps to be easily aligned or combined compared to traditional ground maps which usually include more than just ground surface or surface topology.

The point cloud is used to determine the ground map domain, using a filtering process which isolates points of the point cloud deemed to relate to the ground surface. The term "ground map domain" is used to describe the complete set of point cloud points that are likely to correlate to the ground. Example embodiments seek to generate a substantially optimal ground map using filtered point cloud data. Specifically, this application focuses on the generation of a representation of the surface topology over real-world geographical areas, with data obtained by at least two sensors, as a ground map. In doing so, the process of the described embodiments implements a filtering or segmentation function which seeks to identify relevant point cloud data associated with the ground prior to performing ground map optimization functions and machine learning techniques suitable for reconstructing a more precise and scalable ground map.

Unlike existing techniques of generating ground maps, example embodiments make use of two sets of input data to determine a ground map domain for the ground map generation process, such as sets of input data captured by at least two different sensors. In some embodiments, the at least two sensors are required to be calibrated. Typically, the at least two sensors include, but are not limited to, an image sensor as the first sensor and a LiDAR sensor as the second sensor. Calibration of these sensors can assist by filtering out LiDAR points, for example, by removing points that are located on the sensor platforms themselves as these points are not relevant to the ground map. Even in datasets obtained using a relatively small number of vehicles, calibration of image sensors and LiDAR sensors can remove approximately 88% of unnecessary LiDAR points in the captured point cloud, relative to all points visible in the image data. In the following described embodiments, it may be assumed that the two sensors are pre-calibrated.

Furthermore, embodiments described herein seek to provide a method for full or substantially full generation of a ground map of geographical areas, which can include both the drivable road surface and the street surface or only the drivable road surface as part of the generated ground map. Some embodiments will reduce computation time and allow for implementation of a more suitable or optimal metric to be used for the computation of errors over the entire domain of the ground map. In some embodiments, the generated ground map covers the entire width of the street, thus the ground map domain is used to establish the parts of the street surface that are suitable for vehicles to drive on or not. In example embodiments, the ground map domain can be determined from point clouds by filtering or segmentation techniques.

FIG. 3 shows an example system 300 for gathering sensor data and creating a ground map according to an embodiment.

Multiple sensor platforms 302 (although in other embodiments only one platform can instead be used) are each provided with image sensors (e.g. a still or video camera) and LiDAR sensors, each set of which are pre-calibrated with each other on each sensing platform. The sensing platforms 302 traverse an environment to be mapped. The sensor data captured by the sensor platforms 302 is used by the ground map generation and optimization engines 304, 306, 308. The engine 304 for creating the ground map domain may use the filtering/segmentation process described above, for example, in the embodiment shown in FIG. 2.

The engine 306 may be configured to perform optimization on the created ground map domain based on distance and confidence values. Specifically, points in the point cloud that have been gathered using a LiDAR that was relatively far away from a respective real world sampling point of the environment are given a weighting lower than points where the LiDAR sensor was closer to the respective sampling point. Further, where the confidence that a point is classified correctly as ground (for example, from the image data) or where the noise or other error indicator is high for a point (for example, a low signal to noise value), then a weighting for low (and conversely high) confidence is applied or associated with each point in the point cloud. Thus, engine 306 can perform optimization to smooth out low confidence points.

Also, the engine 308 may be configured to interpolate the dilated points to mitigate problems where there are gaps in the sensor data (e.g. due to occlusions in the environment when it was mapped using the sensor platform 302). The ground map produced by these engines 304, 306, 308 is stored in a data store 310.

In some embodiments, ground maps can be generated remotely from the sensor platforms, providing faster ground map generation and more efficiently update the ground map with new portions and changes within the environment.

In some embodiments, there is a reference ground map(s) that can serve as a standard against which the reconstructed ground map is compared.

In some embodiments, for areas of the ground map where there are no or few points, the ground map may be provided with a "flatness prior," for example, by applying a slope constraint.

In some embodiments, the confidence score of each of the filtered "ground" points of the point cloud is saved and each point weighed accordingly.

In some embodiments, only points that are near to the vehicle are used for the local ground map in order to mitigate noise as much as possible, so points are filtered by sensing distance to reduce noise.

In some embodiments, filtering of the point cloud data can be improved. For example, point cloud data (e.g., LiDAR points) can be organized into voxels and then weighted by the speed at which they were obtained to compensate for different densities achieved using different LiDAR rotation speeds. Furthermore, in response to a query, voxel-filtered points may be allowed to return not only the first point in the voxel, but also the voxel's total weight.

Figure 4A:
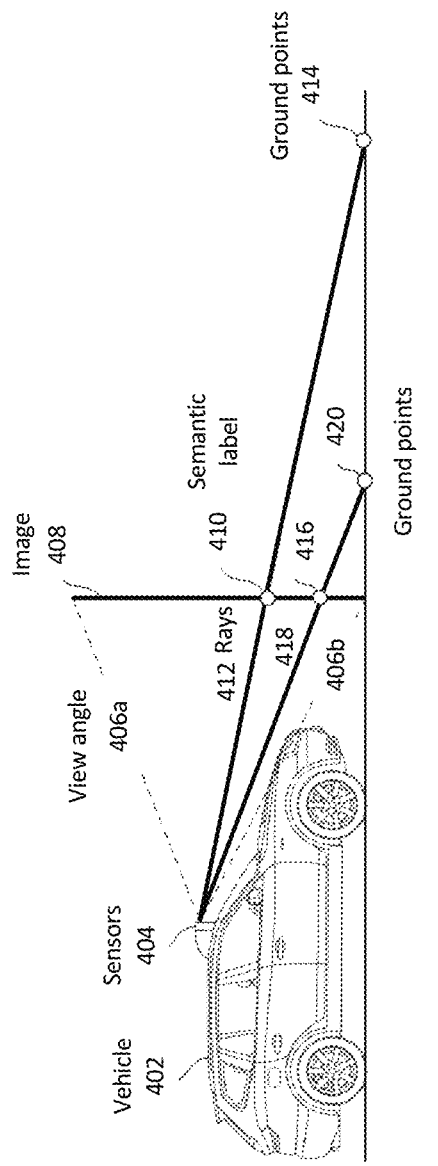
FIGS. 4A and 4B illustrate an example sensor platform and use of the vehicle to illustrate translation of two-dimensional labels into three-dimensional labels, according to an embodiment.
Figure 4B:
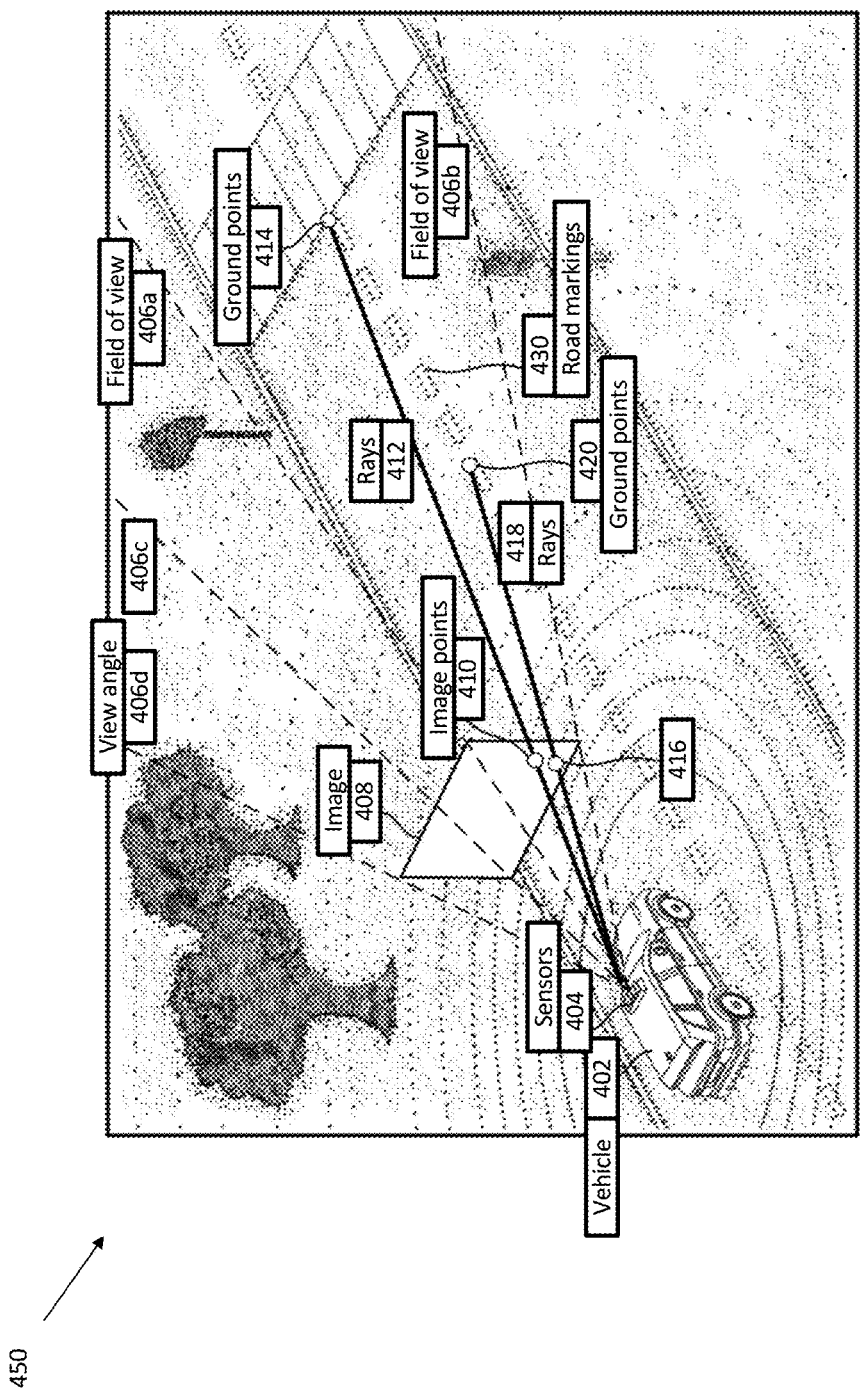

FIGS. 4A and 4B demonstrate an example sensor platform 400, demonstrating translation of two-dimensional semantic labels in an image to three-dimensional semantic labels in a geometric map. A geometric map captures geometry derived from the collected point clouds using sensor platforms 400. In some embodiments the map can be provided as a multi-layer map that includes, but is not limited to, a semantic layer providing semantic data of a geographical area, a geometric layer providing geometric data of a geographical area, a ground map layer and a common co-ordinate reference frame.

FIG. 4A specifically depicts the example sensor platform 400 from a side plan view, for simplicity, while FIG. 4B depicts the example sensor platform 450 from a perspective view, in use. FIGS. 4A-B depict a vehicle 402, having a sensor 404. As mentioned above, in some embodiments this may be a multiple sensor platform which is provided with image sensors and/or LiDAR sensors. In this example, the vehicle is provided with a camera device that uses one or more image sensors. The camera 404 is used to capture an image 408. A field of view of the camera 404 is demonstrated using dotted lines 406a, 406b, 406c, and 406d (lines 406c and 406d are shown only in FIG. 4B). The dotted lines 406a-d define a view frustum, or field of view, for the image 408 within the geometric map. The image 408 has two two-dimensional semantic labels 410, 416 applied to it which correspond to points on the image 408. Since the camera direction, position, and orientation are known when the image 408 was captured, the two-dimensional positions of the two-dimensional semantic labels 410, 416 within the image 408 can be translated into three-dimensional positions in a geometric map. For example, for the two-dimensional semantic label 410, a view ray 412 can be extended from the position of the camera 404 at an angle or direction that corresponds to the two-dimensional position of the semantic label 410 within the image 408. The three-dimensional translation of the two-dimensional semantic label 410 will be positioned somewhere along the view ray 412 within the three-dimensional geometric map.

Furthermore, if it is known that the two-dimensional semantic label 410 corresponds to a physical feature on the road surface (e.g., a lane marker), the precise three-dimensional position of the semantic label 410 can be determined based on where the view ray 412 intersects the road surface in the geometric map. In the example shown in FIGS. 4A-B, the view ray 412 intersects the road surface at a point 414. As such, a three-dimensional semantic label can be applied to the geometric map at the point 414. Similarly, for the two-dimensional semantic label 416, a view ray 418 is extended so that the extended view ray 418 intersects the road surface at a point 420. As such, a three-dimensional semantic label, which corresponds to the two-dimensional semantic label 416, can be applied to the geometric map at the point 420. As discussed above, each two-dimensional semantic label may be associated with semantic data in a semantic map identifying a particular physical feature. Each three-dimensional semantic label corresponds with a two-dimensional semantic label and, therefore, is also associated with the same semantic data as the two-dimensional semantic label. For example, in FIG. 4B, the two-dimensional semantic labels 410, 416 are both associated with a center lane marker 430, which is determined to be part of the ground map domain. The three-dimensional semantic labels at positions 414, 420 indicate the position of the center lane marker 430 within the three-dimensional geometric map. In this way, image pixels can be populated with a plurality of semantic labels which accurately indicate areas of the ground and areas which are not part of the ground.

As demonstrated above in the example scenario depicted in FIGS. 4A-B, translation of a two-dimensional position in an image to a three-dimensional position within a geometric map may include determining where an extended view ray intersects a ground or road surface within the geometric map. As such, it is a method that can be used to generate ground maps, which represent a ground surface of a geographical area. It may also be used to determine the ground map domain which can be configured and optimized to generate a ground map based on point cloud data or any other data used to generate a three-dimensional geometric map for example.

In example embodiments, the space within the image data can be divided into a conceptual two-dimensional grid and the number of ground points and non-ground points in each cell of the two-dimensional grid are identified and classified as such through the assessment of characteristics within the image data. By extrapolation of the rays which detect points 410 and 416 of the image 408 in FIG. 4A, it can be seen that 414 and 420 correspond to points on the ground, and thus the LiDAR points in the point cloud data corresponding to the pixels in the image 408, 410, 416 are identified as part of a ground map domain and are to be included in the generated ground map. By segmenting images into image pixels and correlating the segmented images onto the point cloud data, a model can be fitted only to use filtered data points identified to be on the ground, or substantially the ground surface, and not be distorted by objects adjacent or overlooking the road, such as trees, for example. Any known methods of image segmentation, for example, the use of machine learning techniques such as neural networks, can be used to distinguish areas of the image that correspond to the ground. In this way, filtered/segmented images or image pixels provide a better quality ground map domain that has greater coverage of geographical areas compared to current methods.

Figure 5:
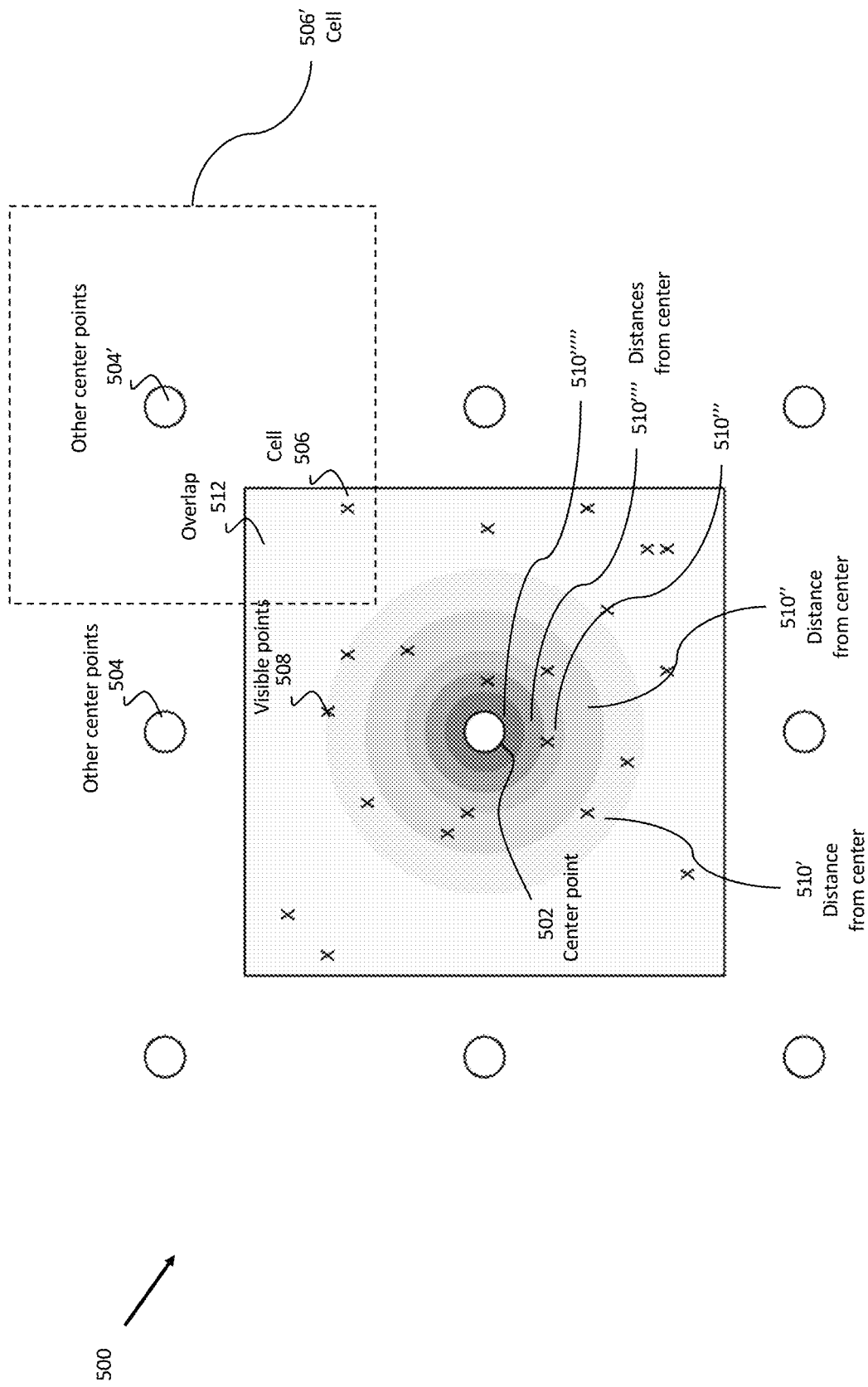
FIG. 5 illustrates an example representation of a cells or divisions of a ground map with point cloud data.

Referring now to FIG. 5, sections of the ground 500 will now be described in relation to point cloud data that has been captured. In this illustrated view, the ground surface 500 (which corresponds to the ground map domain) can be conceptually divided into two-dimensional sections or cells 506, sometimes alternatively described as "pixels". The ground surface can be divided into any uniform or non-uniform geometric shapes and sizes and can be based on geographical area(s), limited to a range of point cloud points per division, or on an overlap of point cloud points with neighboring or surrounding divisions. In FIG. 5, the cell 506 comprises a number of points of point cloud data which are represented as crosses 508. Although in this embodiment the cell 506 is illustrated as a square with a center point 502, in order to generate a ground map over all shapes of geographical areas, in other embodiments, each cell 506 can be represented as any two-dimensional shape (e.g., rectangle, triangle, etc.). In this embodiment, the point cloud points 508 shown are the filtered point cloud points and are now used to calculate the raw height of the points in the point cloud of the cells 506 and/or a height of the ground map.

In some embodiments, a two-dimensional cell 506 can be substantially large enough to enable a neighboring cell 506', as shown through their center points 502, 504', to overlap 512. However, large overlaps with one or more neighboring cells 506, 506' can result in inefficient computational duplication for larger cell sizes, so in some embodiments, to provide a more efficient method the ground map may be divided into cells such that there are no overlapping cells within the ground map. Whether there is an overlap or not, in this embodiment each X and Y coordinate of the ground map is associated with only a single Z coordinate, i.e., a single average height.

Figure 5A:
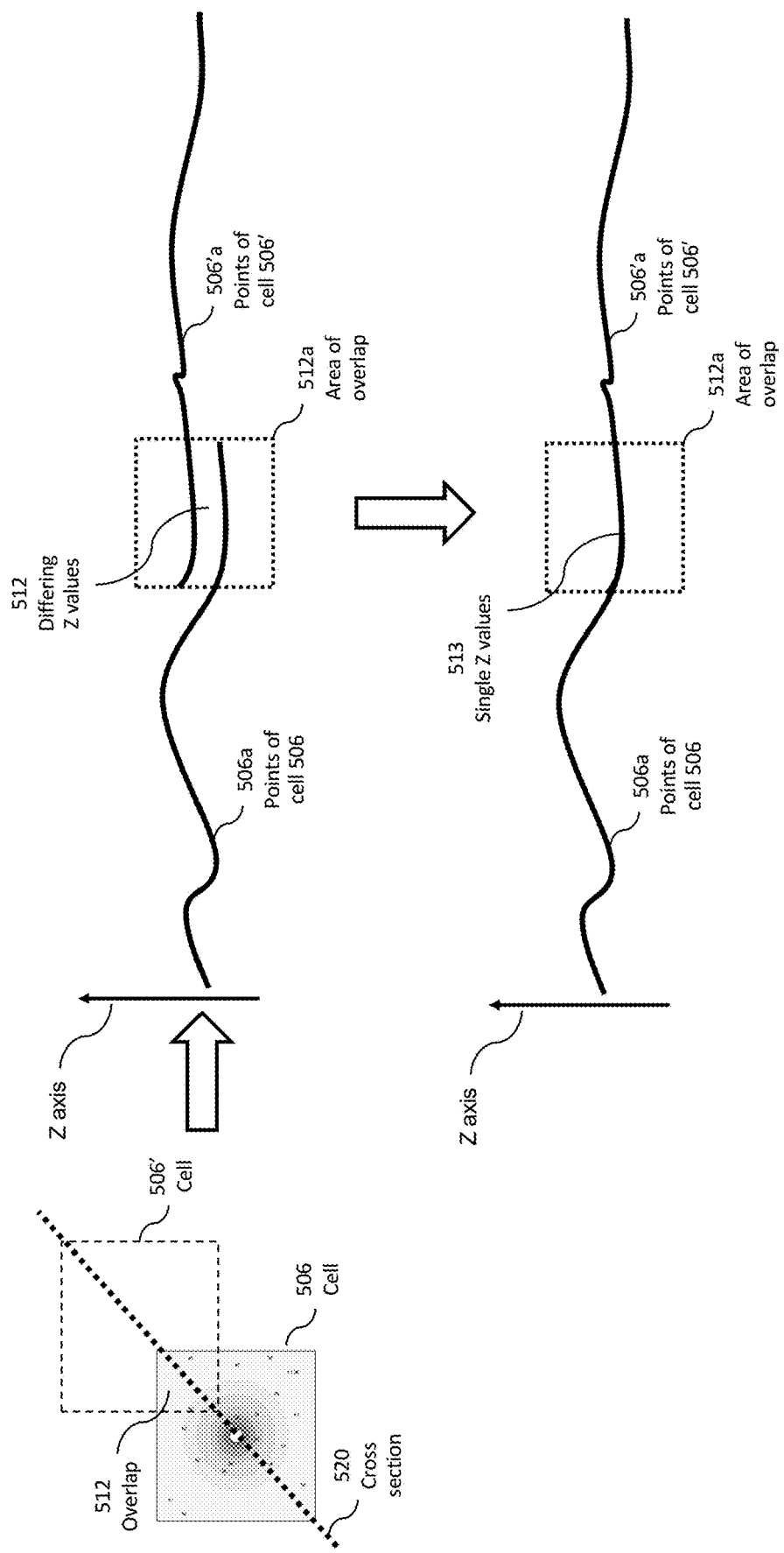
FIG. 5A illustrates the process of addressing Z value differences between points of the point cloud in regions of overlapping cell data.

For example, with reference to FIG. 5A, a cross section 520 of the two overlapping cells, 506, 506' in FIG. 5 is illustrated in relation to a Z-axis. Line 506a represents the points of cell 506 along the Z-axis whilst line 506' a represents the points of the neighboring and overlapping cell 506'. As illustrated in FIG. 5A, a portion 512a of the two cells overlap but due to differences which may occur as a result of LiDAR defects such as reflection/refraction or differences between multiple LiDAR datasets, etc., the two lines hold differing Z values 512 even though they correspond to the same ground area or surface topology. In this example, differences between Z coordinates at overlapping cell portions are resolved through averaging point cloud data in order to provide single Z coordinates 513 (e.g., average heights) for the ground map. In other embodiments, a grid is overlaid on the ground map (for example, but not limited to, a cell size of approximately 20% of local ground map width in order to ensure some overlap), and a local ground map is created around the center 502, 504, 504' of each cell 506, 506' where the ground map domain contains any value.

Figure 5B:
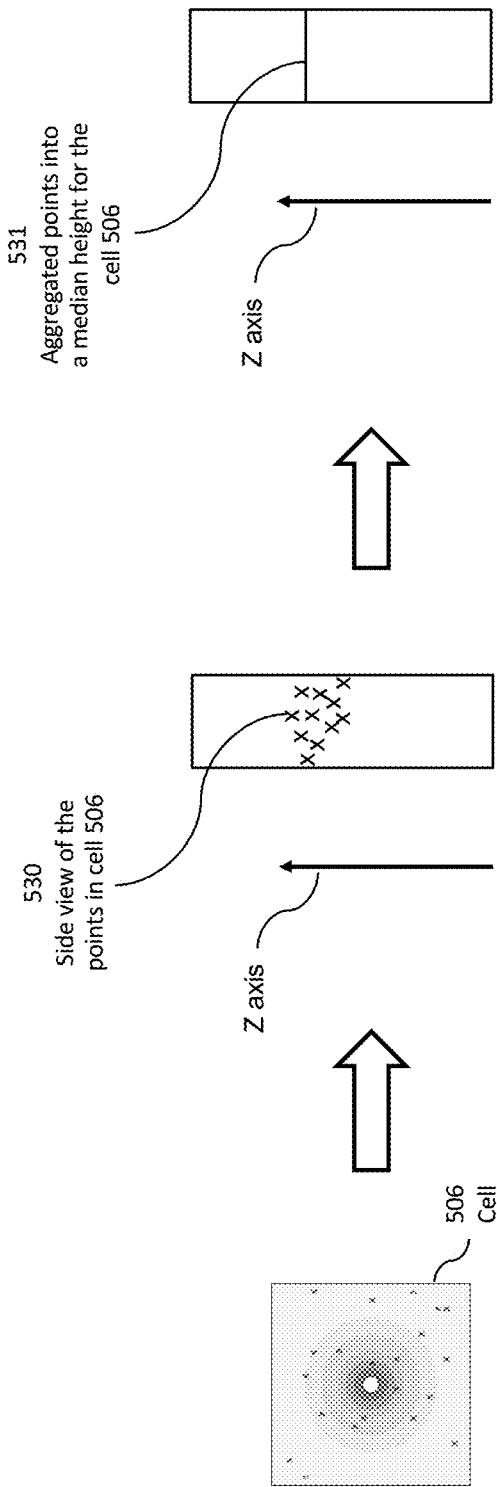
FIG. 5B depicts a side elevation of the points in a cell and the process of aggregating points into a median height for the cell used to generate ground maps.

Referring back to FIG. 5, in each cell 506, point cloud data points 508 that fall within that respective cell 506 are weighted with a Gaussian function with respect to a distance 510', 510" . . . 510"" from each point to the center of the cell (shown as a set of rings around the center point 502), such that points that are closer to the center are assigned more importance, for example, by applying a weighting that assigns more value to those points closer to the center 502 of the cell 506. The Gaussian function transforms the calculated standard deviation into a confidence score for each cell 506. In some embodiments, the scale of the Gaussian function can be adjusted based on the size of the cell 506, the amount of overlap 512 with neighboring cells 506', the number of point cloud data points 508 contained within an average cell, and/or using any other variable or consideration as one of ordinary skill in the art would recognize. In some embodiment, weighted medians, representing the raw height of the points' Z coordinates may be calculated using the weightings above and used to evaluate an estimated height of the area or object corresponding to the determined cell. As an example, FIG. 5B illustrates the points of a cell 506 in a side elevated view 530. The scattered points within the cell are shown by the grouped collection of "x" markings 530. A height of the cell is then determined based on an aggregated median of the points contained in the cell which is illustrated as line 531. This provides a single height value for each cell, but, as mentioned above, since it is a weighted median, more value is given to the points closer to the center of the cell. In an embodiment, the ground map depicting the surface topology of a drivable road surface is generated using the weighted median height values determined from each cell. Since each cell corresponds to a geographical area, the ground map is generated based on the determined height values of each cell.

Embodiments may use thresholding or weighting methods to determine whether or not a cell should be included in the final ground map. For example, a cell may be included in the final ground map if it is determined that the height determined above indicates that the cell is part of the ground (or removed from the ground map if it is determined that the cell corresponds to an object or area that is not part of the ground map). In some embodiments, the thresholding for filtering cells can be based on a confidence score. This can be done by transforming per-pixel statistics into a confidence score between zero and one, for example, which represents the accuracy of values for each data point. However, in some embodiments, this may be a relative threshold in order to overcome influences of point cloud density.

Typically, if the number of identified ground points relative to the total number of points in a particular cell is greater than a certain threshold, the local ground map for that cell can be included as part of the ground map. Typically, the threshold for including cell local ground maps is as low as approximately only one percent, for example. With reference to the example embodiment described above, this means that even when little ground surface data is gathered for a geographical area by a LiDAR sensor, it is still considered in the method for generating a ground map as an additional filter or classification is to be performed by the second dataset provided by the image sensor(s). Cells that contain, or represent, even the smallest portion of the ground surface should also have their local ground map considered to be included in the final ground map.

The ground map domain can then be used by ground map generation methods. For example, instead of using vehicle trajectory to sample the sensor data, the ground map domain can be split into smaller, local, ground maps and can then be optimized as they are identified, per cell.

In example embodiments, some cells may have data with a high standard deviation, for instance where segmentation errors caused points to appear in the point cloud data above the road surface where only points correlating to the ground are supposed to remain. A high standard deviation may not be detrimental, for instance, if there are many points close to the ground surface and only a small number of points on a tree branch two meters above the road, for example, the median function will still select an appropriate ground height to be used in the ground map generation process. Current methods of ground map generation do not detect such outliers of points within the point cloud. Thus, it may be plausible to distrust pixels with standard deviation of more than five centimeters, for example, and filter these.

In example embodiments, the ground map domain can be input into a ground map optimizer, for example, by writing one or more local ground maps to files (e.g., as shown at block 206 in FIG. 2). In example embodiments, local ground maps can be processed in parallel as shown at block 208 in FIG. 2 and can be combined into a global ground map as shown at block 210 in FIG. 2.

Each cell or local map of the ground map may be optimized by the optimization engine 306 by minimizing a set of loss functions or constraints. This allows desirable properties in the ground map domain to be expressed, such as low curvature, and can be configured with several tunable parameters.

When processing the non-filtered point cloud, in one embodiment the optimization engine 306 may use a loss factor that incentivizes retaining only the point cloud points with the lowest Z (height) coordinate, for given X and Y coordinates, i.e., to reflect the typical situation that the ground is usually below other detected objects, such as cars. For example, and with reference to the example embodiment mentioned above, a LiDAR dataset for a certain geographical area may include a number of different point cloud data, all at different heights. This can suggest that the area is occupied by not only the ground, with a surface topology, but also by an object on the ground (such as a branch, leaves, trash, etc.). In order to generate an accurate ground map, the surface topology of the geographical area must be represented without any objects which are likely to be impermanent, and in order to avoid the inclusion of point cloud data that correspond to these impermanent objects, the lowest detected points will be considered to be the ground points.

In some embodiments, the optimization engine 306 can also receive real-world ground map statistics, or wheel constraints, to use as weightings when optimizing the ground map. In some embodiments, the set of constraints may be implemented by the optimization engine 306 including constraints enforcing a smooth surface by penalizing discontinuities, large slopes, and curvatures amongst neighboring height map pixels in order to obtain smooth surfaces. The set of constraints can also include a constraint that forces the ground map to fit the point cloud data by penalizing the distance between each point of the point cloud and height values in the ground map. Using a loss function, penalization can be reduced for points in the point cloud obtained by a senor that was far away from the ground surface when the points were obtained.

In some embodiments, the ground map may be represented using a height map, and the methods disclosed herein may handle the height map generation as an optimization problem that finds an optimal solution based on a set of constraints through an optimization engine as shown as 306 in FIG. 3. In some embodiments, the set of constraints can include a constraint requiring that a vehicle's wheels must touch the ground surface. Using information about a vehicle that was used to capture data such as point cloud data from which a geometric map was generated, methods may be capable of computing wheel positions where the vehicle's wheels should touch the ground and penalizes the distance between wheel positions and the nearest height value in the ground map.

Figure 5C:
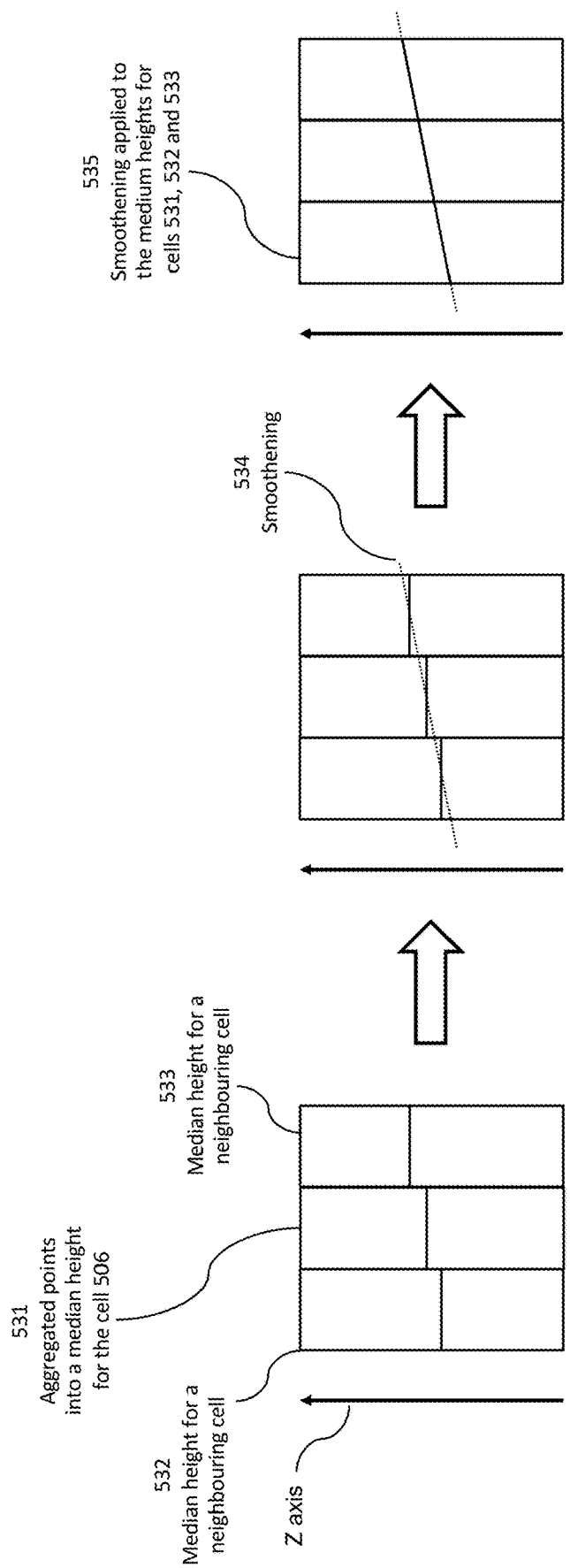
FIG. 5C illustrates smoothening the median height values of the cells with its neighboring cells.

In example embodiments, distance and confidence terms can be used to apply smoothing filters. In some embodiments, there may be further terms that may be used to contribute to the smoothing of the ground map, such as an intensity or height, for example, using a bilateral filter which carries out edge-preserving smoothing when combined with the distance term. FIG. 5C depicts an example smoothening process applied to neighboring cells, each with a determined median height 531, 532, 533. In order to produce smooth ground maps that better represent the surface topology of a geographical area, the smoothening line 534 can be used to transform the median heights of the cells into a unified and smooth curve which is seen in 535, and one that better represents the real world.

The illustration shown in FIG. 6 provides a "tile" of multiple cells represented as 7×7 grid of cells as shown as 602. The weight of a cell is the product of a distance term (Gaussian) and a confidence term, i.e., confidence score as determined previously. In FIG. 6, each cell or pixel of the grid of cells 602 has associated with it, a compiled confidence score for that cell. The value of the section identified as 604 in FIG. 6 can be computed as a weighted average of the (height value of) cells surrounding it 606. In this example embodiment, a darker cell represents a cell with lower confidence.

As the initial ground map domain generation may include deficiencies and prove inaccurate, for example, by including points which are not actually ground points, missing or incorrect cell values can be corrected using the cell values of surrounding or neighboring cells through the function of dilation. With reference to FIG. 3, the dilation engine 308 performs dilation as a separate function from optimization. Dilation pertains to the estimation of height for a set of grid points (sometimes referred to as a "domain," i.e., where the X and Y coordinates correspond to grid coordinates in a coordinate system, and where Z is the direction of gravity or height/elevation). Since optimization 306 is a separate step, it can still be performed on grid points or height estimations added to the ground map by the dilation engine 308.

In example embodiments, the process of dilation is performed by engine 308 in FIG. 3 in order to fill gaps or regions of void in the ground map domain caused by occlusions due to heavy traffic, parked cars, or impermanent objects, for example. The dilation process is used in order to fill in the regions of void or remedy these occlusions and can also be used to correct untrusted or incorrect values.

Figure 6A:
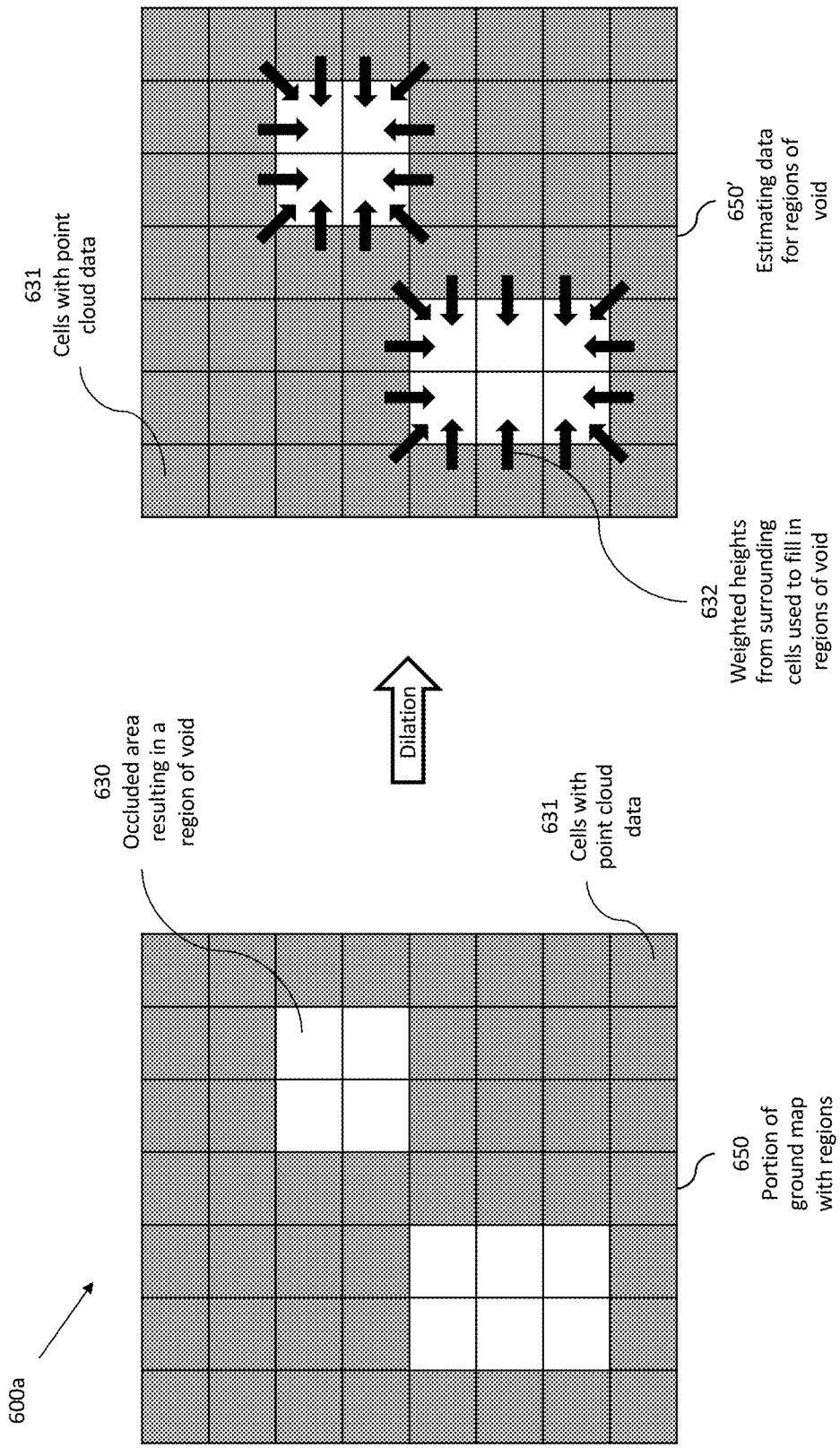
FIG. 6A illustrates an example dilation process where point cloud points from surrounding or neighboring cells are used to fill in gaps or regions of void in a ground map.

FIG. 6A illustrates in more detail how the dilation process provides an estimate for a region of void in an initial ground map based on the data captured by data gathering sensor(s). An example tile 650 is shown with two areas 630 where the sensors did not capture data or where sufficient data corresponding to the ground surface was not obtained. As mentioned above, this region of void could also have been caused by sensor data errors, occlusions on the road surface, etc. In some embodiments the regions of void may represent cells or areas of the ground map considered to have a low confidence score and that should be reassigned with a new estimate value. In either case, the regions of void 630 are surrounded by cells with sufficient data 631. In example embodiments, the data contained by the surrounding tiles include point cloud data and/or an estimate height value. As illustrated by 650', data estimates for the regions of void are provided by the neighboring cells. In some embodiments, the data used from the neighboring/surrounding cells are weighted based on its distance from the region of void or the determined center of the regions of void. In some embodiments, a region of void that is surrounded by at least three sides with cells containing sufficient point cloud data is enough to fill the void. In some embodiments, the newly estimated data for the regions of void also undergo the smoothening process as described in relation to FIG. 5C, and the technique is also described as point cloud fitting. In some embodiments, point cloud fitting may be applied to the median raw height determined for the cell or to one or more estimated points in the cell.

In embodiments, once the weighted average of the cell around the cell is determined, the confidence term can act as an output weight. This substantially results in the maintenance of high-confidence points, while low-confidence or no-confidence are removed from neighboring cells. In the example embodiment of ground map generation, confidence scores are used to determine when a portion of the map is to be trusted. In some embodiments, the confidence score can be used during the function of generating the ground map. Thus, the ground map is only generated from cells that are determined to have a higher confidence score and better represent the real-world surface topology. In other embodiments, for example, low confidence pixels may trigger a feedback loop to verify segmentation or initial filtration results. More particularly, in the case of the embodiment mentioned above, a low confidence score can be used to verify the segmentation of the point cloud data that corresponds to the ground surface and/or the segmentation that is provided by image data. Also, in some embodiments, the confidence score is used to determine which areas of the ground map include incorrect point cloud data that may need to be reconstructed. Typically, in example embodiments, smoothing is targeted to areas of low confidence that have high standard deviation. However, it can also target the whole ground map generation process if necessary.

In some embodiments, outliers obtained from LiDAR reflections or mis-segmentation are substantially avoided by, for example, filtering out outliers from the point cloud by calculating the median height of the point cloud at that local ground map and applying a threshold "cut-off". Otherwise, when correlating LiDAR points to regions of an image, point cloud points substantially within neighboring image regions may not be filtered. In some embodiments, to assist in filtering outlier point cloud points, a time offset of LiDAR points may be included in point cloud data. As an example, reflections on the road that are captured by the sensors result in erroneous data that lead to inaccurate ground map generation. However, using the methods described above, these errors in the data capture should have a low confidence value considering. When considering neighboring or surrounding cells, if you have median heights and data for the cells around a cell that has a higher height value, it can clearly be identified as an anomaly in the road, or during the data capture or segmentation process, and then be filtered out.

In particular embodiments, with reference to FIG. 7, a vehicle 740 may obtain and process sensor and/or telemetry data. Such data may be captured by any suitable sensors. For example, the vehicle 740 may have a LiDAR sensor array of multiple LiDAR transceivers that are configured to rotate 360°, emitting pulsed laser light and measuring the reflected light from objects surrounding vehicle 740. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. The gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 740 along its trajectory in an environment. As an example, and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In particular embodiments, the vehicle may be equipped with stereo vision for, e.g., spotting hazards such as pedestrians or tree branches on the road. As another example, the vehicle 740 may have radars for, e.g., detecting other vehicles and hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 740 may build a 3D model of its surrounding based on data from its LiDAR, radar, sonar, and cameras, along with a pre-generated map obtained from a remote system (e.g., a transportation management system). Although sensors 744 appear in a particular location on the vehicle 740 in FIG. 7, sensors 744 may be located in any suitable location in or on the vehicle 740. Example locations for sensors include the front and rear bumpers, the doors, the front windshield, on the side panel, or any other suitable location.

In particular embodiments, the vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest. The processing unit may provide fully autonomous, semi-autonomous, or manual driving functionality and may rely on the ground map generated by the above techniques in order to understand the geometric differences of the path and/or navigable driving surface that the vehicle may be configured to operate upon. The vehicle may also update the ground map whilst traversing through a geographical area.

Figure 8:
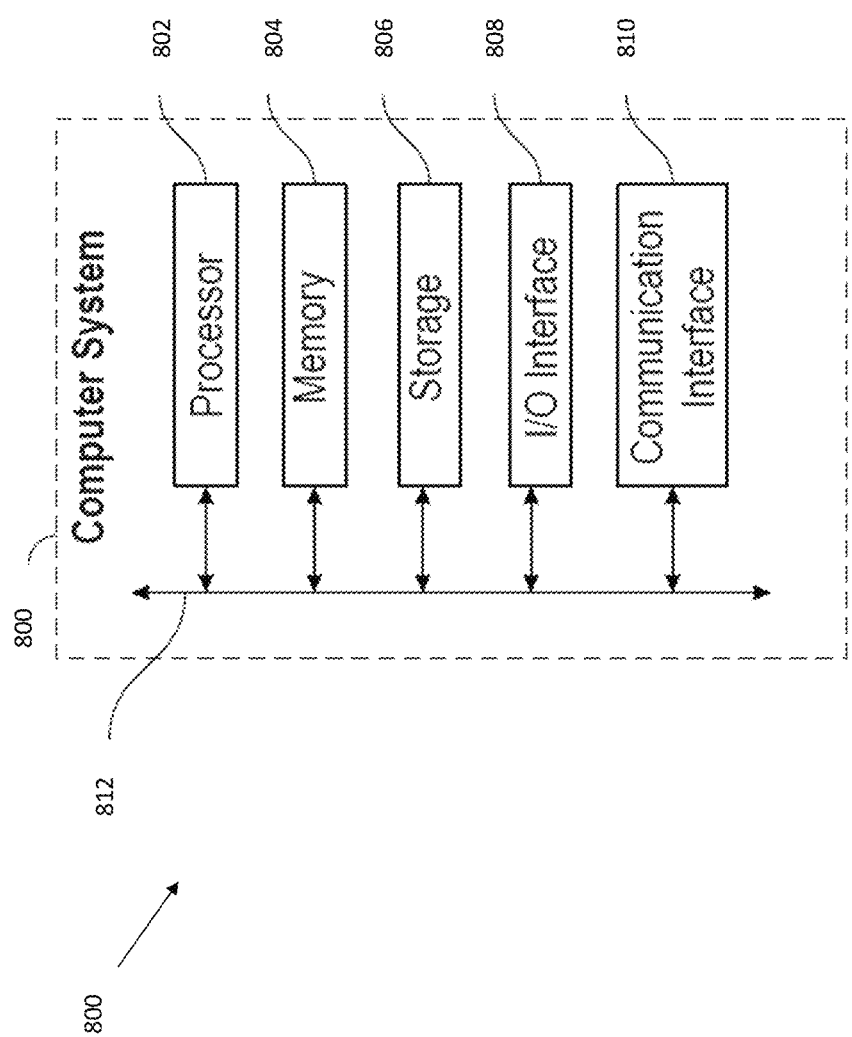
FIG. 8 illustrates an example of a computer system or computing device that can be utilized with an embodiment.

FIG. 8 illustrates an example computer system 800, which may be configured to perform the functions of one or more methods described or illustrated herein either alone or in combination with one or more other computer systems (which may take a similar form to computer system 800). In particular embodiments, software running on computer system 800 may enable computer system 800 to perform one or more functions of the one or more methods described or illustrated herein. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform one or more functions of one or more methods described or illustrated herein without substantial spatial or temporal limitation. As an example, and not by way of limitation, one or more computer systems 800 may perform in real time or in batch mode one or more functions of one or more methods described or illustrated herein. One or more computer systems 800 may perform one or more functions of one or more methods described or illustrated herein at different times or at different locations, where appropriate.

In particular embodiments, computer system 800 includes at least one processor 802, non-transitory computer readable media such as memory 804 and storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing program instructions for causing computer system 900 to carry out one or more functions of one or more methods described or illustrated herein. As an example, and not by way of limitation, to execute program instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or may include multiple processing units. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 912 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may also include multiple memory units, where appropriate. Although this disclosure describes and illustrates particular memory, this disclosure contemplates any suitable memory.

In particular embodiments, storage 806 includes storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may also include multiple storage units. Although this disclosure describes and illustrates particular storage, this disclosure contemplates any suitable storage.

In particular embodiments, I/O interface 808 includes hardware or software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may also include multiple I/O interface units, where appropriate. Although this disclosure describes and illustrates a particular I/O interface, this disclosure contemplates any suitable I/O interface.

In particular embodiments, communication interface 810 includes hardware or software, or both providing one or more interfaces for communication (such as, for example, packet-based communication) between computer system 800 and one or more other computer systems (or other network devices) via one or more networks. As an example, and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may also include multiple communication interface units, where appropriate. Although this disclosure describes and illustrates a particular communication interface, this disclosure contemplates any suitable communication interface.

In particular embodiments, bus 912 includes hardware or software, or both coupling components of computer system 800 to each other. As an example and not by way of limitation, bus 912 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may also include multiple bus units, where appropriate. Although this disclosure describes and illustrates a particular bus, this disclosure contemplates any suitable bus or interconnect.

A map is a depiction of a whole area or a part of an area which emphasizes the relationships between elements in space such as objects, landmarks, road signs, road names, or location. In some embodiments, a road map may display transport links and include points of interest, such as prominent buildings, tourism sites, recreational facilities, and airports. In example embodiments, maps or sections of a map may be dynamic and/or interactive with integration of an automatic or a semi-automatic system. In a semi-automated system, manual input may be used to adjust, correct, or update sections or whole of the map. In some embodiments, the map may be viewed using a user interface and may be shown as a variety of forms such as a topological map in the form of a schematic diagram, a multi-layer map, or a single corrected and substantially optimized global map or section of the map.

Image data obtained for processing by at least one image sensor (e.g., an image sensor attached to a vehicle), in example embodiments, may be in the form of a raw image file in order to save, with minimum loss of information, data obtained from the sensor, and the conditions surrounding the capturing of the image, i.e. metadata. In example embodiments, in order to convert image metadata into a photographic rendering of a scene, and then store them as a standard graphical format, processing may be carried out locally within the image sensor, or in a raw-file converter, or by using a remote method. Typically, processing image data may include, but not limited to, decoding, defective pixel removal, noise reduction, compression, optical correction, or dynamic range compression.

In embodiments, raw and/or processed image data may be stored within a cloud storage which may be accessed through a web service application programming interface (API) or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Many variations to the example method are possible. It should be appreciated that there can be additional, fewer, or alternative steps performed in similar or alternative orders, or in parallel, within the scope of the various embodiments discussed herein unless otherwise stated.

Any system features as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

We claim:

1. A method for generating a ground map, the method comprising:
receiving a first dataset that includes images from a first sensor;
receiving a second dataset that includes depth data from a second sensor that is different than the first sensor;
classifying the first dataset by identifying points of the first dataset that correspond to a ground surface, wherein classifying the points of the first dataset facilitates isolating points in the second dataset associated with the ground surface;
filtering the second dataset based on the first dataset to remove points of the second dataset associated with features that are not part of a ground map domain and isolate the ground map domain within the second dataset; and
generating a ground map from the second dataset that is filtered,
wherein the ground map domain defines the ground surface with a surrounding environment of a device that includes the first sensor and the second sensor, wherein classifying includes identifying points in the first dataset associated with respective objects depicted in the first dataset and applying semantic labels to the respective objects.

2. The method as recited in claim 1, wherein the first sensor comprises an image sensor.

3. The method as recited in claim 2, wherein:
the second sensor comprises one or more of: a Light Detection and Ranging (LiDAR) sensor, a Radar sensor, a Sonar sensor, or a stereo camera; and
the second dataset comprises at least one of: depth information; and point cloud data.

4. The method as recited in claim 3, wherein:
the second dataset comprises filtered point cloud data including points that correspond to the ground surface; and
the ground map comprises a three-dimensional reconstruction of the filtered point cloud data.

5. The method as recited in claim 4, further comprising:
separating the point cloud of the ground map into sections, wherein the sections comprises one or more points from the filtered point cloud data, and wherein the sections are determined based on one or more of: size, a number of point cloud points, and an amount of overlap between point cloud points.

6. The method as recited in claim 5, wherein at least one of the sections substantially overlap an adjacent section.

7. The method as recited in claim 5, wherein a respective height the sections is determined based on the one or more points included within the section.

8. The method as recited in claim 7, wherein the respective height of the sections is determined by one or both of (i) weighing each point included within the section based on a gaussian function or (ii) determining a weighted median of the one or more points including within the section.

9. The method as recited in claim 8, wherein the one or more points included within a section are weighted based on a distance to a center of the section.

10. The method as recited in claim 1, further comprising:
identifying one or more regions of void in the ground map to prevent generating the ground map for regions of void.

11. The method as recited in claim 10, wherein the one or more regions of void comprise one or more areas of the environment where the ground surface is obscured from at least one of the first or second sensor.

12. The method as recited in claim 10, further comprising:
performing dilation for the one or more regions of void by determining point cloud data for the second dataset.

13. The method as recited in claim 12, wherein the determined point cloud data is determined based on point cloud data for one or more neighboring sections.

14. The method as recited in claim 12, further comprising:
applying point-cloud fitting in order to smoothen out the determined points for the one or more regions of void relative to one or more neighboring sections.

15. The method as recited in claim 1, further comprising:
receiving one or more semantic data indicators; and
determining three-dimensional locations of each of the one or more semantic data indicators relative to the generated ground map.

16. The method as recited in claim 15, wherein the one or more semantic data indicators are received from a semantic map layer that shares a common coordinate frame with the generated ground map.

17. The method as recited in claim 1, further comprising:
applying a confidence-based smoothing filter to the ground map.

18. The method as recited in claim 1, further comprising:
co-calibrating the first and second sensors.

19. A non-transitory computer-readable medium comprising program instructions that are executable by at least one processor to cause a computing system to:
receive a first dataset that includes images from a first sensor;
receive a second dataset that includes depth data from a second sensor that is different than the first sensor;
classify the first dataset by identifying points of the first dataset that correspond to a ground surface, wherein classifying the points of the first dataset facilitates isolating points in the second dataset associated with the ground surface;
filter the second dataset based on the first dataset; and
generate a ground map from the filtered second dataset to remove points of the second dataset associated with features that are not part of a ground map domain and isolate the ground map domain within the second dataset,
wherein the ground map domain defines the ground surface with a surrounding environment of a device that includes the first sensor and the second sensor, wherein the program instructions to classify include instructions to identify points in the first dataset associated with respective objects depicted in the first dataset and applying semantic labels to the respective objects.

20. A computer system comprising:
at least one processor;

at least one non-transitory computer-readable medium;
program instructions stored on the at least one non-transitory computer-readable medium that are executable by the at least one processor such that the computing system is operable to:
receive a first dataset that includes images from a first sensor;
receive a second dataset that includes depth data from a second sensor;
classify the first dataset by identifying points of the first dataset that correspond to a ground surface, wherein classifying the points of the first dataset facilitates isolating points in the second dataset associated with the ground surface;
filter the second dataset based on the first dataset; and
generate a ground map from the filtered second dataset to remove points of the second dataset associated with features that are not part of a ground map domain and isolate the ground map domain within the second dataset,
wherein the ground map domain defines the ground surface with a surrounding environment of a device that includes the first sensor and the second sensor, and wherein the program instructions to classify include instructions to identify points in the first dataset associated with respective objects depicted in the first dataset and applying semantic labels to the respective objects.

* * * * *